(12) United States Patent
Akhbari et al.

(10) Patent No.: US 11,188,735 B2
(45) Date of Patent: Nov. 30, 2021

(54) FAKE FINGER DETECTION USING RIDGE FEATURES

(71) Applicant: InvenSense, Inc., San Jose, CA (US)

(72) Inventors: Sina Akhbari, San Jose, CA (US);
Lingtao Wang, San Jose, CA (US);
Mei-Lin Chan, Milpitas, CA (US);
Nikhil Apte, Palo Alto, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/909,917

(22) Filed: Jun. 23, 2020

(65) Prior Publication Data

US 2020/0401783 A1 Dec. 24, 2020

Related U.S. Application Data

(60) Provisional application No. 62/865,810, filed on Jun. 24, 2019.

(51) Int. Cl.
*G06K 9/00* (2006.01)

(52) U.S. Cl.
CPC ......... *G06K 9/0012* (2013.01); *G06K 9/0002* (2013.01); *G06K 9/0008* (2013.01); *G06K 9/00107* (2013.01)

(58) Field of Classification Search
CPC ............. G06K 9/0012; G06K 9/00107; G06K 9/0008; G06K 9/0002
See application file for complete search history.

(56) References Cited

U.S. PATENT DOCUMENTS

| 4,880,012 A | 11/1989 | Sato |
| 5,575,286 A | 11/1996 | Weng et al. |
| 5,684,243 A | 11/1997 | Gururaja et al. |
| 5,808,967 A | 9/1998 | Yu et al. |

(Continued)

FOREIGN PATENT DOCUMENTS

| CN | 1826631 A | 8/2006 |
| CN | 102159334 A | 8/2011 |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Premal R Patel

(57) ABSTRACT

In a method for determining whether a finger is a real finger at an ultrasonic fingerprint sensor, a first image of a fingerprint pattern is captured at an ultrasonic fingerprint sensor, wherein the first image is based on ultrasonic signals corresponding to a first time of flight range. A second image of the fingerprint pattern is captured at the ultrasonic fingerprint sensor, wherein the second image is based on ultrasonic signals corresponding to a second time of flight range, the second time of flight range being delayed compared to the first time of flight range. A difference in a width of ridges of the fingerprint pattern in the first image compared to the width of ridges of the fingerprint pattern in the second image is quantified. Based on the quantification of the difference, a probability whether the finger is a real finger is determined.

17 Claims, 12 Drawing Sheets

(56) References Cited

U.S. PATENT DOCUMENTS

| | | | |
|---|---|---|---|
| 5,867,302 A | 2/1999 | Fleming | |
| 5,911,692 A | 6/1999 | Hussain et al. | |
| 6,071,239 A | 6/2000 | Cribbs et al. | |
| 6,104,673 A | 8/2000 | Cole et al. | |
| 6,289,112 B1 | 9/2001 | Jain et al. | |
| 6,292,576 B1* | 9/2001 | Brownlee | G06K 9/00006 340/5.83 |
| 6,350,652 B1 | 2/2002 | Libera et al. | |
| 6,428,477 B1 | 8/2002 | Mason | |
| 6,483,932 B1 | 11/2002 | Martinez et al. | |
| 6,500,120 B1 | 12/2002 | Anthony | |
| 6,676,602 B1 | 1/2004 | Barnes et al. | |
| 6,736,779 B1 | 5/2004 | Sano et al. | |
| 7,067,962 B2 | 6/2006 | Scott | |
| 7,109,642 B2 | 9/2006 | Scott | |
| 7,243,547 B2 | 7/2007 | Cobianu et al. | |
| 7,257,241 B2 | 8/2007 | Lo | |
| 7,400,750 B2 | 7/2008 | Nam | |
| 7,433,034 B1 | 10/2008 | Huang | |
| 7,459,836 B2 | 12/2008 | Scott | |
| 7,471,034 B2 | 12/2008 | Schlote-Holubek et al. | |
| 7,489,066 B2 | 2/2009 | Scott et al. | |
| 7,634,117 B2 | 12/2009 | Cho | |
| 7,739,912 B2 | 6/2010 | Schneider et al. | |
| 8,018,010 B2 | 9/2011 | Tigli et al. | |
| 8,139,827 B2 | 3/2012 | Schneider et al. | |
| 8,255,698 B2 | 8/2012 | Li et al. | |
| 8,311,514 B2 | 11/2012 | Bandyopadhyay et al. | |
| 8,335,356 B2 | 12/2012 | Schmitt | |
| 8,433,110 B2 | 4/2013 | Kropp et al. | |
| 8,508,103 B2 | 8/2013 | Schmitt et al. | |
| 8,515,135 B2 | 8/2013 | Clarke et al. | |
| 8,666,126 B2 | 3/2014 | Lee et al. | |
| 8,703,040 B2 | 4/2014 | Liufu et al. | |
| 8,723,399 B2 | 5/2014 | Sammoura et al. | |
| 8,805,031 B2 | 8/2014 | Schmitt | |
| 9,056,082 B2 | 6/2015 | Liautaud et al. | |
| 9,070,861 B2 | 6/2015 | Bibl et al. | |
| 9,224,030 B2 | 12/2015 | Du et al. | |
| 9,245,165 B2 | 1/2016 | Slaby et al. | |
| 9,424,456 B1 | 8/2016 | Kamath Koteshwara et al. | |
| 9,572,549 B2 | 2/2017 | Belevich et al. | |
| 9,582,102 B2 | 2/2017 | Setlak | |
| 9,582,705 B2 | 2/2017 | Du et al. | |
| 9,607,203 B1 | 3/2017 | Yazdandoost et al. | |
| 9,607,206 B2 | 3/2017 | Schmitt et al. | |
| 9,613,246 B1 | 4/2017 | Gozzini et al. | |
| 9,665,763 B2 | 5/2017 | Du et al. | |
| 9,747,488 B2 | 8/2017 | Yazdandoost et al. | |
| 9,785,819 B1 | 10/2017 | Oreifej | |
| 9,815,087 B2 | 11/2017 | Ganti et al. | |
| 9,817,108 B2 | 11/2017 | Kuo et al. | |
| 9,818,020 B2 | 11/2017 | Schuckers et al. | |
| 9,881,195 B2 | 1/2018 | Lee et al. | |
| 9,881,198 B2 | 1/2018 | Lee et al. | |
| 9,898,640 B2 | 2/2018 | Ghavanini | |
| 9,904,836 B2 | 2/2018 | Yeke Yazdandoost et al. | |
| 9,909,225 B2 | 3/2018 | Lee et al. | |
| 9,922,235 B2 | 3/2018 | Cho et al. | |
| 9,934,371 B2 | 4/2018 | Hong et al. | |
| 9,939,972 B2 | 4/2018 | Shepelev et al. | |
| 9,953,205 B1 | 4/2018 | Rasmussen et al. | |
| 9,959,444 B2 | 5/2018 | Young et al. | |
| 9,967,100 B2 | 5/2018 | Hong et al. | |
| 9,983,656 B2 | 5/2018 | Merrell et al. | |
| 9,984,271 B1 | 5/2018 | King et al. | |
| 10,275,638 B1 | 4/2019 | Yousefpor et al. | |
| 10,315,222 B2 | 6/2019 | Salvia et al. | |
| 10,322,929 B2 | 6/2019 | Soundara Pandian et al. | |
| 10,387,704 B2 | 8/2019 | Dagan et al. | |
| 10,461,124 B2 | 10/2019 | Berger et al. | |
| 10,478,858 B2 | 11/2019 | Lasiter et al. | |
| 10,497,747 B2 | 12/2019 | Tsai et al. | |
| 10,515,255 B2* | 12/2019 | Strohmann | G06K 9/22 |
| 10,539,539 B2 | 1/2020 | Garlepp et al. | |
| 10,600,403 B2 | 3/2020 | Garlepp et al. | |
| 10,656,255 B2 | 5/2020 | Ng et al. | |
| 10,670,716 B2 | 6/2020 | Apte et al. | |
| 10,706,835 B2 | 7/2020 | Garlepp et al. | |
| 10,755,067 B2 | 8/2020 | De Foras et al. | |
| 2002/0135273 A1 | 9/2002 | Mauchamp et al. | |
| 2003/0013955 A1 | 1/2003 | Poland | |
| 2004/0085858 A1 | 5/2004 | Khuri-Yakub et al. | |
| 2004/0122316 A1 | 6/2004 | Satoh et al. | |
| 2004/0174773 A1 | 9/2004 | Thomenius et al. | |
| 2005/0023937 A1 | 2/2005 | Sashida et al. | |
| 2005/0057284 A1 | 3/2005 | Wodnicki | |
| 2005/0100200 A1 | 5/2005 | Abiko et al. | |
| 2005/0110071 A1 | 5/2005 | Ema et al. | |
| 2005/0146240 A1 | 7/2005 | Smith et al. | |
| 2005/0148132 A1 | 7/2005 | Wodnicki et al. | |
| 2005/0162040 A1 | 7/2005 | Robert | |
| 2006/0052697 A1 | 3/2006 | Hossack et al. | |
| 2006/0079777 A1 | 4/2006 | Karasawa | |
| 2006/0230605 A1 | 10/2006 | Schlote-Holubek et al. | |
| 2006/0280346 A1 | 12/2006 | Machida | |
| 2007/0046396 A1 | 3/2007 | Huang | |
| 2007/0047785 A1 | 3/2007 | Jang et al. | |
| 2007/0073135 A1 | 3/2007 | Lee et al. | |
| 2007/0202252 A1 | 8/2007 | Sasaki | |
| 2007/0215964 A1 | 9/2007 | Khuri-Yakub et al. | |
| 2007/0223791 A1 | 9/2007 | Shinzaki | |
| 2007/0230754 A1 | 10/2007 | Jain et al. | |
| 2008/0125660 A1 | 5/2008 | Yao et al. | |
| 2008/0150032 A1 | 6/2008 | Tanaka | |
| 2008/0194053 A1 | 8/2008 | Huang | |
| 2008/0240523 A1 | 10/2008 | Benkley et al. | |
| 2009/0005684 A1 | 1/2009 | Kristoffersen et al. | |
| 2009/0182237 A1 | 7/2009 | Angelsen et al. | |
| 2009/0232367 A1 | 9/2009 | Shinzaki | |
| 2009/0274343 A1 | 11/2009 | Clarke | |
| 2009/0303838 A1 | 12/2009 | Svet | |
| 2010/0030076 A1 | 2/2010 | Vortman et al. | |
| 2010/0046810 A1 | 2/2010 | Yamada | |
| 2010/0113952 A1 | 5/2010 | Raguin et al. | |
| 2010/0168583 A1 | 7/2010 | Dausch et al. | |
| 2010/0195851 A1 | 8/2010 | Buccafusca | |
| 2010/0201222 A1 | 8/2010 | Adachi et al. | |
| 2010/0202254 A1 | 8/2010 | Roest et al. | |
| 2010/0239751 A1 | 9/2010 | Regniere | |
| 2010/0251824 A1 | 10/2010 | Schneider et al. | |
| 2010/0256498 A1 | 10/2010 | Tanaka | |
| 2010/0278008 A1 | 11/2010 | Ammar | |
| 2011/0285244 A1 | 11/2011 | Lewis et al. | |
| 2011/0291207 A1 | 12/2011 | Martin et al. | |
| 2012/0016604 A1 | 1/2012 | Irving et al. | |
| 2012/0092026 A1 | 4/2012 | Liautaud et al. | |
| 2012/0095347 A1 | 4/2012 | Adam et al. | |
| 2012/0147698 A1 | 6/2012 | Wong et al. | |
| 2012/0224041 A1 | 9/2012 | Monden | |
| 2012/0232396 A1 | 9/2012 | Tanabe | |
| 2012/0238876 A1 | 9/2012 | Tanabe et al. | |
| 2012/0263355 A1* | 10/2012 | Monden | G06K 9/00114 382/124 |
| 2012/0279865 A1 | 11/2012 | Regniere et al. | |
| 2012/0288641 A1 | 11/2012 | Diatezua et al. | |
| 2012/0300988 A1 | 11/2012 | Ivanov et al. | |
| 2013/0051179 A1 | 2/2013 | Hong | |
| 2013/0064043 A1 | 3/2013 | Degertekin et al. | |
| 2013/0127592 A1 | 5/2013 | Fyke et al. | |
| 2013/0133428 A1 | 5/2013 | Lee et al. | |
| 2013/0201134 A1 | 8/2013 | Schneider et al. | |
| 2013/0271628 A1 | 10/2013 | Ku et al. | |
| 2013/0294201 A1 | 11/2013 | Hajati | |
| 2013/0294202 A1 | 11/2013 | Hajati | |
| 2014/0003679 A1 | 1/2014 | Han et al. | |
| 2014/0060196 A1 | 3/2014 | Falter et al. | |
| 2014/0117812 A1 | 5/2014 | Hajati | |
| 2014/0176332 A1 | 6/2014 | Alameh et al. | |
| 2014/0208853 A1 | 7/2014 | Onishi et al. | |
| 2014/0219521 A1 | 8/2014 | Schmitt et al. | |
| 2014/0232241 A1 | 8/2014 | Hajati | |
| 2014/0265721 A1 | 9/2014 | Robinson et al. | |
| 2014/0294262 A1 | 10/2014 | Schuckers et al. | |

(56) References Cited

U.S. PATENT DOCUMENTS

| | | |
|---|---|---|
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0345987 A1 | 12/2015 | Hajati |
| 2015/0371398 A1 | 12/2015 | Qiao et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1* | 3/2016 | Gu ............. G06K 9/00114 382/125 |
| 2016/0086010 A1 | 3/2016 | Merrell et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0180142 A1 | 6/2016 | Riddle et al. |
| 2016/0326477 A1 | 11/2016 | Fernandez-Alcon et al. |
| 2016/0350573 A1* | 12/2016 | Kitchens, II ......... G06K 9/0002 |
| 2016/0358003 A1 | 12/2016 | Shen et al. |
| 2017/0004346 A1 | 1/2017 | Kim et al. |
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0075700 A1 | 3/2017 | Abudi et al. |
| 2017/0076132 A1 | 3/2017 | Sezan et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0200054 A1* | 7/2017 | Du ....................... G06K 9/001 |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0025202 A1 | 1/2018 | Ryshtun et al. |
| 2018/0032788 A1 | 2/2018 | Krenzer et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0150679 A1 | 5/2018 | Kim et al. |
| 2018/0178251 A1 | 6/2018 | Foncellino et al. |
| 2018/0206820 A1 | 7/2018 | Anand et al. |
| 2018/0225495 A1* | 8/2018 | Jonsson ................. G06K 9/22 |
| 2018/0229267 A1 | 8/2018 | Ono et al. |
| 2018/0276443 A1 | 9/2018 | Strohmann et al. |
| 2018/0329560 A1 | 11/2018 | Kim et al. |
| 2018/0341799 A1 | 11/2018 | Schwartz et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0057267 A1* | 2/2019 | Kitchens, II ........ G01S 7/52036 |
| 2019/0073507 A1 | 3/2019 | D'Souza et al. |
| 2019/0087632 A1 | 3/2019 | Raguin et al. |
| 2019/0102046 A1 | 4/2019 | Miranto et al. |
| 2019/0130083 A1 | 5/2019 | Agassy et al. |
| 2019/0171858 A1 | 6/2019 | Ataya et al. |
| 2019/0188441 A1 | 6/2019 | Hall et al. |
| 2019/0188442 A1 | 6/2019 | Flament et al. |
| 2019/0325185 A1 | 10/2019 | Tang |
| 2019/0340455 A1 | 11/2019 | Jung et al. |
| 2019/0370518 A1 | 12/2019 | Maor et al. |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050820 A1 | 2/2020 | Iatsun et al. |
| 2020/0050828 A1 | 2/2020 | Li et al. |
| 2020/0074135 A1 | 3/2020 | Garlepp et al. |
| 2020/0125710 A1 | 4/2020 | Andersson et al. |
| 2020/0147644 A1 | 5/2020 | Chang |
| 2020/0158694 A1 | 5/2020 | Garlepp et al. |
| 2020/0175143 A1 | 6/2020 | Lee et al. |
| 2020/0210666 A1 | 7/2020 | Flament |
| 2020/0285882 A1 | 9/2020 | Skovgaard et al. |
| 2020/0302140 A1 | 9/2020 | Lu et al. |
| 2020/0342203 A1 | 10/2020 | Lin et al. |
| 2020/0410193 A1 | 12/2020 | Wu |

FOREIGN PATENT DOCUMENTS

| | | |
|---|---|---|
| CN | 105264542 A | 1/2016 |
| CN | 105378756 A | 3/2016 |
| CN | 109255323 A | 1/2019 |
| EP | 1214909 A1 | 6/2002 |
| EP | 2884301 A1 | 6/2015 |
| EP | 3086261 A2 | 10/2016 |
| JP | 2011040467 A | 2/2011 |
| TW | 201531701 A | 8/2015 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192895 A1 | 11/2017 |
| WO | 2017196678 A1 | 11/2017 |
| WO | 2017196681 A1 | 11/2017 |
| WO | 2017196682 A1 | 11/2017 |

(56) References Cited

FOREIGN PATENT DOCUMENTS

| | | |
|---|---|---|
| WO | 2017192903 A3 | 12/2017 |
| WO | 2019164721 A1 | 8/2019 |

OTHER PUBLICATIONS

ISA/EP, Partial International Search Report for International Application No. PCT/US2019/034032, 8 pages, dated Sep. 12, 2019, 8.

ISA/EP, International Search Report and Written Opinion for International Application # PCT/US2018/063431, pp. 1-15, dated Feb. 5, 2019.

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

ISA/EP, International Search Report and Written Opinion for International Application No. PCT/US2017/031120, 12 pages, dated Aug. 29, 2017.

ISA/EP, International Search Report and Written Opinion for International Application No. PCT/US2017/031127, 13 pages, dated Sep. 1, 2017.

ISA/EP, International Search Report and Written Opinion for International Application No. PCT/US2017/031134, 12 pages, dated Aug. 30, 2017.

ISA/EP, International Search Report and Written Opinion for International Application No. PCT/US2017/031140, 18 pages, dated Nov. 2, 2017.

ISA/EP, International Search Report and Written Opinion for International Application No. PCT/US2017/031421 13 pages, dated Jun. 21, 2017.

ISA/EP, International Search Report and Written Opinion for International Application No. PCT/US2017/031426 13 pages, dated Jun. 22, 2017.

ISA/EP, International Search Report and Written Opinion for International Application No. PCT/US2017/031431, 14 pages, dated Aug. 1, 2017.

ISA/EP, International Search Report and Written Opinion for International Application No. PCT/US2017/031434, 13 pages, dated Jun. 26, 2017.

ISA/EP, International Search Report and Written Opinion for International Application No. PCT/US2017/031439, 10 pages, dated Jun. 20, 2017.

ISA/EP, International Search Report and Written Opinion for International Application No. PCT/US2017/031824, 18 pages, dated Sep. 22, 2017.

ISA/EP, International Search Report and Written Opinion for International Application No. PCT/US2017/031827, 16 pages, dated Aug. 1, 2017.

ISA/EP, International Search Report and Written Opinion for International Application No. PCT/US2017/031831, 12 pages, dated Jul. 21, 2017.

ISA/EP, International Search Report and Written Opinion for International Application No. PCT/US2018/037364, 10 pages, dated Sep. 3, 2018.

ISA/EP, International Search Report for International Application No. PCT/US2017/031826, 16 pages, dated Feb. 27, 2018.

ISA/EP, Partial International Search Report for International Application No. PCT/US2017/031826, 12 pages, dated Nov. 30, 2017.

"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf [retrieved on Jan. 24, 2019], Aug. 9, 2017, 1-8.

Office Action for CN App No. 201780029016.7 dated Mar. 24, 2020, 7 pages.

"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.

"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.

"TMS320C5515 Fingerprint Development Kit (FDK) Hardware Guide", Texas Instruments, Literature No. SPRUFX3, XP055547651, Apr. 2010, 1-26.

"ZTE V7 MAX. 5,5" smartphone on MediaTeck Helio P10 cpu; Published on Apr. 20, 2016; https://www.youtube.com/watch?v=ncNCbpkGQzU (Year: 2016).

Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.

Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.

Lee, et al., "Low jitter and temperature stable MEMS oscillators", Frequency Conlrol Symposium (FCS), 2012 IEEE International, May 1-5, 2012.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.10.1063/1.4939217, 2015, 127231.

Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.

Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, Sep. 15, 2003.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.

Rozen, et al., "Air-Coupled Aluminum Nitride Piezoelectric Micromachined Ultrasonic Transducers At 0.3 MHZ To 0.9 MHZ", 2015 28th IEEE International Conference on Micro Electro Mechanical Systems (MEMS), IEEE, Jan. 18, 2015, 921-924.

Savoia, et al., "Design and Fabrication of a cMUT Probe for Ultrasound Imaging of Fingerts", 2010 IEEE International Ultrasonics Symposium Proceedings, Oct. 2010, 1877-1880.

(56) References Cited

OTHER PUBLICATIONS

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.

Zhou, et al., "Partial Fingerprint Reconstruction with Improved Smooth Extension", Network and System Security, Springer Berlin Heidelberg, Jun. 3, 2013, 756-762.

ISA/EP, International Search Report and Written Opinion for International Application No. PCT/US2020/033854, 16 pages, dated Nov. 3, 2020.

ISA/EP, International Search Report and Written Opinion for International Application No. PCT/US2020/039208, 10 pages, dated Oct. 9, 2020.

ISA/EP, International Search Report and Written Opinion for International Application No. PCT/US2020/039452, 11 pages, dated Sep. 9, 2020.

ISA/EP, International Search Report and Written Opinion for International Application No. PCT/US2020/042427, 18 pages, dated Dec. 14, 2020.

ISA/EP, International Search Report and Written Opinion for International Application No. PCT/US2021/021412, 12 pages, dated Jun. 9, 2021.

ISA/EP, International Search Report and Written Opinion for International Application No. PCT/US2021/021561, 9 pages, dated Jun. 28, 2021.

ISA/EP, Partial Search Report and Provisional Opinion for International Application No. PCT/US2020/042427, 13 pages, dated Oct. 26, 2020.

ISA/EP, Partial Search Report for International Application No. PCT/US2020/033854, 10 pages, dated Sep. 8, 2020.

Office Action for CN App No. 201780029016.7 dated Sep. 25, 2020, 7 pages.

Tang, et al., "11.2 3D Ultrasonic Fingerprint Sensor-on-a-Chip", 2016 IEEE International Solid-State Circuits Conference, IEEE, Jan. 31, 2016, 202-203.

ISA/EP, International Search Report and Written Opinion for International Application No. PCT/US2019061516, 14 pages, dated Mar. 12, 2020.

Taiwan Application No. 106114623, 1st Office Action, dated Aug. 5, 2021, pp. 1-8.

* cited by examiner

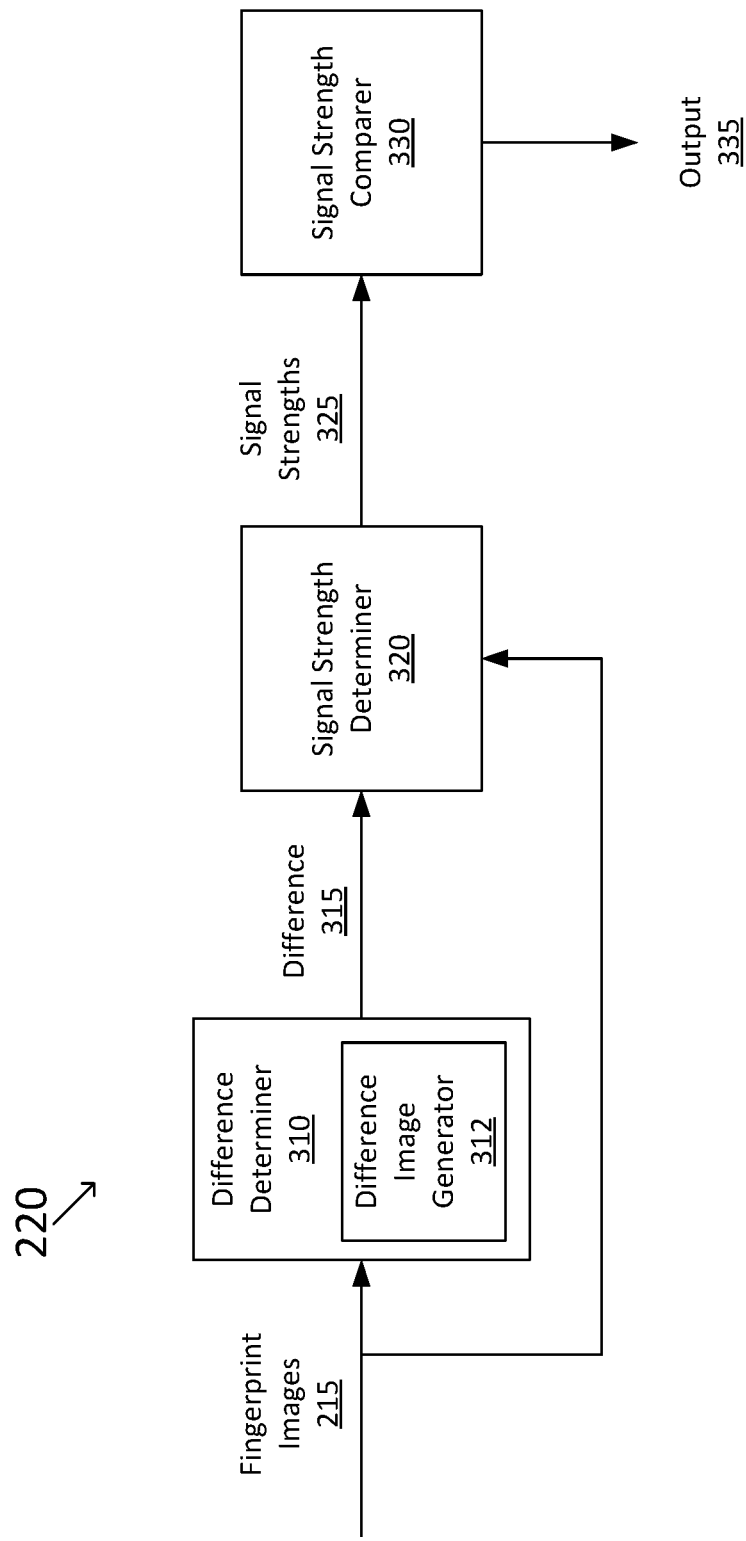

FAKE FINGER DETECTION USING RIDGE FEATURES

RELATED APPLICATIONS

This application claims priority to and the benefit of U.S. Patent Provisional Patent Application 62/865,810, filed on Jun. 24, 2019, entitled "FAKE FINGER DETECTION BY RIDGE NARROWING," by Akhbari et al., and assigned to the assignee of the present application, which is incorporated herein by reference in its entirety.

BACKGROUND

Fingerprint sensors have become ubiquitous in mobile devices as well as other devices (e.g., locks on cars and buildings) and applications for authenticating a user's identity. They provide a fast and convenient way for the user to unlock a device, provide authentication for payments, etc. It is essential that fingerprint sensors operate at a level of security that, at a minimum, reduces the potential for circumvention of security of fingerprint authentication. For instance, fake fingers having fake or spoofed fingerprints can be used to attempt to circumvent fingerprint authentication at fingerprint sensors.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

FIGS. 3A and 3B illustrate block diagrams of a difference quantifier, according to some embodiments.

DESCRIPTION OF EMBODIMENTS

Figure 1:
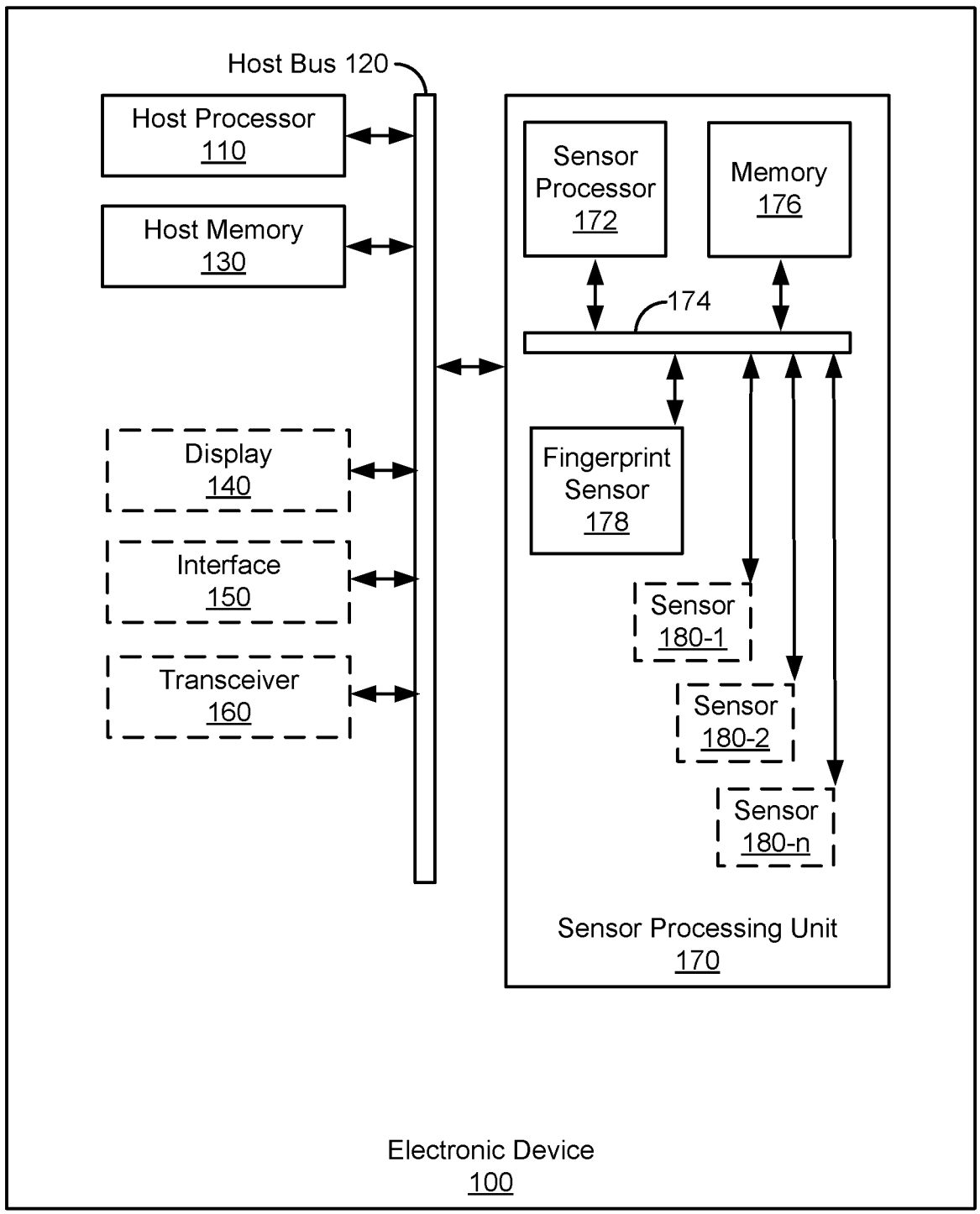
FIG. 1 is a block diagram of an example electronic device 100 upon which embodiments described herein may be implemented.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "capturing," "quantifying," "determining," "comparing," "generating," "providing," "receiving," "analyzing," "confirming," "displaying," "presenting," "using," "completing," "instructing," "executing," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of a device including a fingerprint sensor, upon which described embodiments can be implemented. An example fingerprint sensor and system for determining whether a fingerprint image is generated using a real finger or a fake finger is then described, in accordance with various embodiments. Example operations of a fingerprint sensor for determining whether a fingerprint image is generated using a real finger or a fake finger based on features of finger ridges of the captured fingerprint images are then described.

Fingerprint sensors are used in electronic devices for user authentication, such as mobile electronic devices and applications operating on mobile electronic devices, locks for accessing cars or buildings, for protecting against unauthorized access to the devices and/or applications. Authentication of a fingerprint at a fingerprint sensor is performed before providing access to a device and/or application. In order to circumvent fingerprint authentication, attempts can be made to copy or spoof fingerprints of an authorized user using a fake or artificial finger. As such, fingerprint sensors should be capable of distinguishing real fingers from fake, artificial, or even dead fingers, also referred to herein as performing "spoof detection" or "fake finger detection". A "spoofed" fingerprint is a fake or artificial fingerprint that is used to attempt to circumvent security measures requiring fingerprint authentication. For example, an artificial finger may be used to gain unauthorized access to the electronic device or application, by making an unauthorized copy of the fingerprint of an authorized user, e.g., "spoofing" an actual fingerprint. The spoof detection may be performed by analyzing fingerprint images captured by the fingerprint sensor, e.g., performing biometric analysis of the fingerprint images, or looking at any characteristics that can help distinguish a fake/spoof fingerprint from a real fingerprint. These characteristics may be static features or dynamic features which have a certain time dependency because they change over time.

Embodiments described herein provide methods and systems for determining whether a finger interacting with a fingerprint sensor, for purposes of authentication, is a real finger or a fake finger based on observed features of finger ridges of the captured fingerprint images. Observed features of finger ridges may refer to the width of ridges of the ridge/valley pattern of captured fingerprint images. For example, a feature of the finger ridge may include a profile of the ridge, and how the profile changes based on depth and/or deformation. In some embodiments, capturing multiple fingerprint images using different times of flight allows for detecting ridge features that are indicative of whether a finger is a real finger or a fake finger.

Embodiments described herein provide for determining whether a finger is a real finger at an ultrasonic fingerprint sensor. A first image of a fingerprint pattern is captured at an ultrasonic fingerprint sensor, wherein the first image is based on ultrasonic signals corresponding to a first time of flight range. A second image of the fingerprint pattern is captured at the ultrasonic fingerprint sensor, wherein the second image is based on ultrasonic signals corresponding to a second time of flight range, the second time of flight range being delayed compared to the first time of flight range. A difference in a width of ridges of the fingerprint pattern in the first image compared to the width of ridges of the fingerprint pattern in the second image is quantified. Based on the quantification of the difference, a probability whether the finger is a real finger is determined.

In some embodiments, quantifying the difference in the width of the ridges of the fingerprint pattern in the first image compared to the width of ridges of the fingerprint pattern in the second image includes determining a difference between the first image and the second image. In one embodiment, a difference image is generated by subtracting the second image from the first image (or vice-versa). A first signal strength is determined at a first spatial frequency range of at least one of the first image and the second image and a second signal strength is determined at a second spatial frequency range of the difference between the first image and the second image. In one embodiment, the first signal strength corresponds to a maximum in signal strength of the first spatial frequency range and wherein the second signal strength corresponds to a maximum in signal strength of the second spatial frequency range. In one embodiment, the second frequency range is distributed around a frequency substantially double a main frequency contribution of the first frequency range. In one embodiment, the first spatial frequency range corresponds to a spatial ridge frequency range of the fingerprint pattern.

The first signal strength is compared to the second signal strength. In some embodiments, a ratio of the second signal strength to the first signal strength is determined. Provided the ratio satisfies a ratio range threshold, it is determined that the finger is a real finger. In one embodiment, the ratio range threshold is above 0.8. Based on the comparing, the probability that the finger is a real finger is determined. In one embodiment, the probability that the finger is a real finger is based on the ratio of the second signal strength to the first signal strength, wherein the probability that the finger is a real finger increases as the ratio of the second signal strength to the first signal strength increases.

In other embodiments, determining the second signal strength at the second spatial frequency range of the difference between the first image and the second image includes determining the second signal strength at the second spatial frequency of the of the difference image. In some embodiments, quantifying the difference in the width of the ridges of the fingerprint pattern in the first image compared to the width of ridges of the fingerprint pattern in the second image includes determining a first average width of ridges of the fingerprint pattern of the first image and determining a second average width of ridges of the fingerprint pattern of the second image. A difference between the first average width and the second average width is quantified. In some embodiments, a ratio of the first average width to the second average width is determined. In some embodiments, determining the probability whether the finger is a real finger includes comparing of the ratio of the first average width and the second average width to a width range threshold.

Example Mobile Electronic Device

Turning now to the figures, FIG. 1 is a block diagram of an example electronic device 100. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a doorknob, a car start button, an automated teller machine (ATM), etc. In accordance with various embodiments, electronic device 100 is capable of reading fingerprints.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, doorknobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Electronic device 100 also includes a general purpose sensor assembly in the form of integrated Sensor Processing Unit (SPU) 170 which includes sensor processor 172, memory 176, a fingerprint sensor 178, and a bus 174 for facilitating communication between these and other components of SPU 170. In some embodiments, SPU 170 may include at least one additional sensor 180 (shown as sensor 180-1, 180-2, . . . 180-n) communicatively coupled to bus 174. In some embodiments, at least one additional sensor 180 is a force or pressure sensor (e.g. a touch sensor) configured to determine a force or pressure or a temperature sensor configured to determine a temperature at electronic device 100. The force or pressure sensor may be disposed within, under, or adjacent fingerprint sensor 178. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device and is coupled to host bus 120 through an interface (not shown). It should be appreciated that, in accordance with some embodiments, that SPU 170 can operate independent of host processor 110 and host memory 130 using sensor processor 172 and memory 176.

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that fingerprint sensor 178 and additional sensor 180, when included, may also utilize processing and memory provided by other components of electronic device 100, e.g., host processor 110 and host memory 130.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, fingerprint sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from fingerprint sensor 178 and/or one or more sensor 180, as well as the received data either in its raw form or after some processing. Such algorithms and routines may be implemented by sensor processor 172 and/or by logic or processing capabilities included in fingerprint sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental factors. In one example, sensor 180-1 may comprise an acoustic sensor, sensor 180-2 may comprise a temperature sensor, and sensor **180-*n*** may comprise a motion sensor.

In some embodiments, fingerprint sensor 178 and/or one or more sensors 180 may be implemented using a microelectromechanical system (MEMS) that is integrated with sensor processor 172 and one or more other components of SPU 170 in a single chip or package. It should be appreciated that fingerprint sensor 178 may be disposed behind display 140. Although depicted as being included within SPU 170, one, some, or all of fingerprint sensor 178 and/or one or more sensors 180 may be disposed externally to SPU 170 in various embodiments. It should be appreciated that fingerprint sensor 178 can be any type of fingerprint sensor, including without limitation, an ultrasonic sensor, an optical sensor, a camera, etc.

Figure 2:
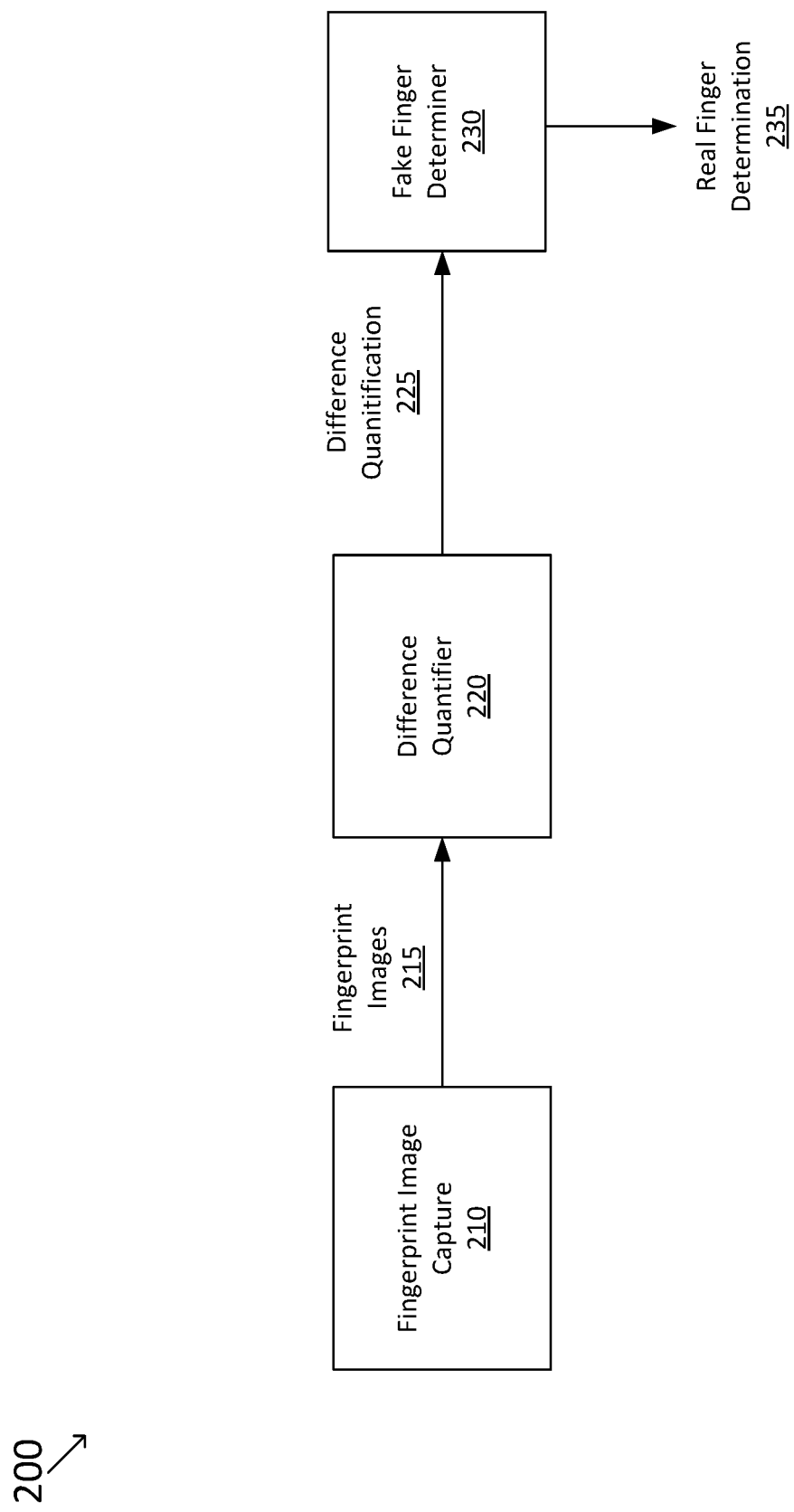
FIG. 2 illustrates a block diagram of an example fingerprint sensing system for determining whether a fingerprint image was generated using a real finger or a fake finger, according to some embodiments.

Example Fingerprint Sensor and System for Determining Whether a Finger is a Real Finger or a Fake Finger FIG. 2 illustrates a block diagram of an example fingerprint sensing system 200 for determining whether a fingerprint image was generated using a real finger or a fake finger, according to some embodiments. Fingerprint sensing system 200 is configured to determine whether a finger is a real finger or a fake finger using ridge features (e.g., width) from fingerprint images captured at the ultrasonic fingerprint sensor. It should be appreciated that fingerprint sensing system 200 can be implemented as hardware, software, or any combination thereof. It should also be appreciated that fingerprint image capture 210, difference quantifier 220, and fake finger determiner 230 may be separate components, may be comprised within a single component, or may be comprised in various combinations of multiple components (e.g., difference quantifier 220 and fake finger determiner 230 may be comprised within a single component), in accordance with some embodiments.

Fingerprint images 215 are captured at fingerprint image capture 210. It should be appreciated that, in accordance with various embodiments, fingerprint image capture 210 is an ultrasonic sensor (e.g., a sensor capable of transmitting and receiving ultrasonic signals). The fingerprint sensor is operable to emit and detect ultrasonic waves (also referred to as ultrasonic signals or ultrasound signals). An array of ultrasonic transducers (e.g., Piezoelectric Micromachined Ultrasonic Transducers (PMUTs)) may be used to transmit and receive the ultrasonic waves, where the ultrasonic transducers of the array are capable of performing both the transmission and receipt of the ultrasonic waves. The emitted ultrasonic waves are reflected from any objects in contact with (or in front of) the fingerprint sensor, and these reflected ultrasonic waves, or echoes, are then detected. Where the object is a finger, the waves are reflected from different features of the finger, such as the surface features on the skin, fingerprint, or features present in deeper layers of the finger (e.g., the dermis). Examples of surface features of a finger are ridges and valleys of a fingerprint, e.g., the ridge/valley pattern of the finger. For example, the reflection of the sound waves from the ridge/valley pattern enables the fingerprint sensor to produce a fingerprint image that may be used for identification of the user.

In accordance with some embodiments, at least two fingerprint images 215 are captured at an ultrasonic fingerprint sensor at different times of flight. It should be appreciated that operating parameters of an ultrasonic fingerprint sensor can be controlled, allowing for image capture at different times of flight. For instance, an adjustment of timing of transmission of the ultrasonic signals for ultrasonic transducers of an ultrasonic fingerprint sensor can change the time of flight. For example, a first fingerprint image is captured at a finger surface time of flight (e.g., a time of flight formed for imaging at a contact surface of the ultrasonic transducer) and second fingerprint image is captured at a delayed time of flight (e.g., 50-150 nanoseconds) relative to the first image. Where the finger used for generating the fingerprint images is a real finger, it is typically observed (either visually or analytically) that ridges of the second fingerprint image are narrower than ridges of the first fingerprint image. This event (ridge narrowing) is typically not observed in fake fingers. The time of flight delay may be selected for an optimum ridge narrowing effect, and may be dependent on the user. As such, the delay in time of flight may be determined for user during enrollment.

In some embodiments, the first image is captured with the optimal time of flight (e.g., calibrated time of flight for an optimum image) for measuring at the sensor surface, and the signal integration windows may be optimized for the fake finger detection. For example, in normal fingerprint detection, the integration window may be large (e.g., 50-200 ns), while for the fake finger detection a shorter integration window (e.g., <50 ns) may be used. The signal integration window for the first and second image may be different. Embodiments described herein focus on the use of a first and second image. However, more images may be used at different time of flights, and the methods described herein may then be applied in a similar manner on the plurality of images. The shorter integration window provides more depth resolution. It should be appreciated that the actual integration windows may depend on the ultrasonic fingerprint sensor stack, thickness and material, and acoustic properties of the specific ultrasonic fingerprint sensor design.

In some embodiments, the beam focusing for the two images may be the same, and may be adapted to focus on the top of the sensor stack. In other embodiments, the beam focusing may be different, where the focusing for the second image is at certain depth in the finger or certain depth from the sensor surface.

The capturing of the first and second images may be initiated whenever a change in signal is detected. For example, to capture the images when the user presses the finger on the sensor, the image capture may be started as soon an object or finger starts interacting with the sensor. For an ultrasonic sensor with an array of ultrasonic transducers, a subset of transducers may be active in a low power mode, and as soon as a finger start interacting with the sensor, the full sensor may be activated to capture the sequence of images. In another example, where the user starts lifting the finger, a change in signal may occur as the pressure of the finger is reduced, and this may initiate the image capture. In some embodiments, a background image is captured before a finger contacts the sensor, where the background image can be used to enhance image quality by subtracting from the captured fingerprint images. The change of contact state may be determined by the fingerprint sensor itself, or it may be detected by a second sensor associated with the fingerprint sensor. For example, a pressure sensor, a force sensor, or a touch sensor may be position near, below, or above the fingerprint sensor and this additional sensor may be used to detect a change in contact state that initiates the capturing of the image sequence.

The fingerprint images 215 can include any number of fingerprint images. In some embodiments, two fingerprint images 215 are captured using different times of flight In some embodiments, fingerprint images 215 includes at least two fingerprint images, but it should be appreciated that more than two image can be captured. For example, the fingerprint images 215 forwarded to difference quantifier 220 may include two or more images captured during a steady state while the finger is contacting the ultrasonic fingerprint sensor. The embodiments described herein may then be applied in a similar manner on the plurality of images to determine a change in ridge width as a function of time of flight.

Fingerprint images 215 are received at difference quantifier 220, which is configured to quantify a difference of ridge features (e.g., ridge width) of the fingerprint images 215. The (difference of) ridge features may be determined as a function of time of flight. For instance, ridge narrowing as a function of time of flight can be taken as an indicator for the probability that the finger is a real or fake finger. In general, the depth profile of the ridges can be used as an indicator as to the probability that the finger is a real or fake finger. To determine the probability, embodiments herein quantify the ridge narrowing (e.g., profile change).

FIG. 3A illustrates a block diagram of a difference quantifier 220, according to an embodiment. Fingerprint images 215 are received at difference quantifier 220. At difference determiner 310, a difference between the fingerprint images is determined. In one embodiment, difference determiner includes difference image generator 312, which is configured to generate a difference image by subtracting one of the fingerprint images 215 from another fingerprint image 215. In one embodiment, where there are two fingerprint images 215 captured with different times of flight, the latter captured fingerprint image 215 is subtracted from the earlier captured fingerprint image 215. Difference determiner 310 outputs difference 315. In one embodiment, difference 315 is a difference image. In one embodiment, to detect the ridge narrowing, the second image is subtracted from the first image, and the spatial frequency spectrum of the first image and of the difference image is compared. If the finger is real, due to ridge narrowing of the second image, the ridges of the difference image are observably split. Therefore, the difference image has substantially twice the main spatial frequency compared to the first and second images alone.

Signal strength determiner 320 receives difference 315 and at least one of fingerprint images 215, and is configured to determine signal strengths corresponding to spatial frequency values or ranges. For example, signal strength determiner 320 determines a maximum signal strength at a first spatial frequency of at least one of fingerprint images 215 and a maximum signal strength at a second spatial frequency of difference 315. The first spatial frequency of each of the fingerprint images 215 should be substantially the same. In some embodiments, the second spatial frequency range is distributed around a frequency substantially double a main frequency contribution of the first spatial frequency range. In some embodiments, signal strength determiner 320 determines the maximum signal strength for at least one of fingerprint images 215, and identifies the corresponding spatial frequency (within the first spatial frequency range). Signal strength determiner 320 then determines the maximum signal strength for difference 315 at the second spatial frequency range, where the second spatial frequency range is distributed around a frequency substantially double the frequency contribution of the first frequency range.

The signal strengths 325 are output to signal strength comparer 330. Signal strength comparer 330 is configured to compare the signal strength 325 for at least fingerprint image 215 and difference 315. Output 335 is generated as a result of the comparison, where output 335 includes a probability whether the finger is a real finger or a fake finger. In one embodiment, the ratio of the signal strength of difference 315 to the signal strength of a fingerprint image 215 is determined. The ratio is then compared to a ratio range threshold. In some embodiments, the probability that the finger is a real finger is based on the ratio, wherein the probability that the finger is a real finger increases as the ratio increases. The reasoning is that for real fingers the change in width as a function of time of flight is more observable, and therefore the signal strength of the second spatial frequency range is higher. In one embodiment, the ratio range threshold is greater than 0.8. In some embodiments, output 335 is transmitted to fake finger determiner 230 as difference quantification 225.

It should be appreciated that the use of the spatial frequency spectrum is only one method to analyze the ridge narrowing. Alternative methods may also be used to compare the ridges at the different times of flight, and to create an indicator of liveness. For example, in some embodiments, the width of the ridges of the first image and second image can be compared and a different in the width of the ridges quantified.

Figure 3B:
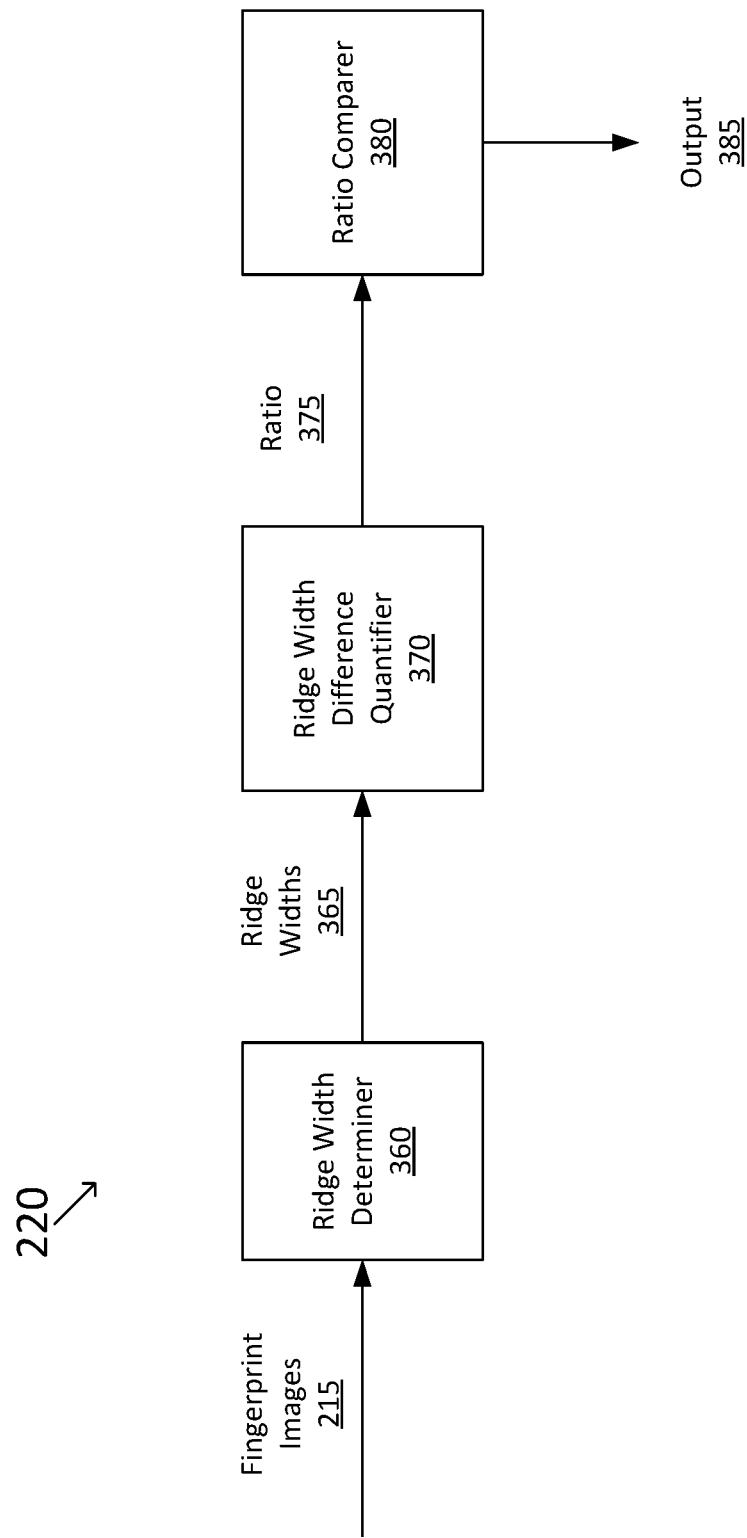

FIG. 3B illustrates a block diagram of difference quantifier 220, according to another embodiment. Fingerprint images 215 are received at difference quantifier 220. At ridge width determiner 360, the average ridge widths 365 of each of fingerprint images 215 is generated. Ridge width difference quantifier 370 receives ridge widths 365 and quantifies a difference between the ridge widths 365. The change of width may be determined as a function of the time of flight. In one embodiments, ridge width difference quantifier 370 determines a ratio 375 of the ridge widths 365. Ratio comparer 380 receives ratio 375, and compares the ratio to a width range threshold. In some embodiments, the probability that the finger is a real finger is based on the ratio. In some embodiments, output 385 is transmitted to fake finger determiner 230 as difference quantification 225.

With reference to FIG. 2, it is determined whether the finger is a real finger based on difference quantification 225 at fake finger determiner 230. In some embodiments, difference quantification 225 is output 335 of FIG. 3A. In other embodiments, difference quantification 225 is output 385 of FIG. 3B. In some embodiments, difference quantification includes a probability whether the finger is a real finger or a fake finger. In some embodiments, fake finger determiner 230 receives input from other types of spoof detection or fake finger detection, and makes the determination 235 as to whether the finger is a fake finger based on multiple inputs. Each type of spoof detection method may produce a probability of whether the finger is a real finger, and fake finger determiner may combine the probabilities to output a decision whether the finger is a real finger. The output may also contain a confidence, based on the one or more spoof detection methods. The different probabilities from different methods may have different weights, which may depend on the user. These weights may have been determined in during enrollment, where it may be determined which spoof detection works best for the user, and may even depend on the context.

Figure 4:
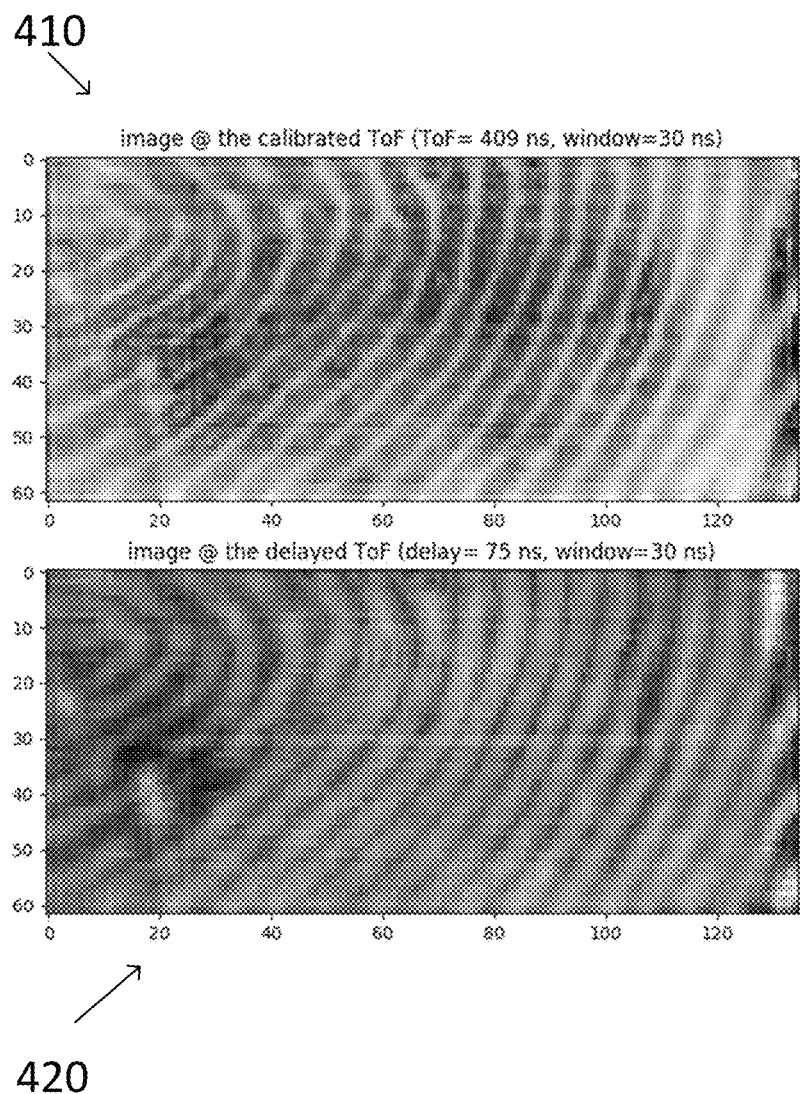
FIG. 4 illustrates example fingerprint images captured at an ultrasonic fingerprint sensor using different times of flight, according to embodiments.

FIG. 4 illustrates example fingerprint images 410 and 420 of a real finger captured at an ultrasonic fingerprint sensor using different times of flight, according to embodiments. Fingerprint image 410 is captured at a first time of flight, where the first time of flight is the standard (e.g., calibrated) time of flight for capturing an image at a surface of the ultrasonic fingerprint sensor. Fingerprint image 420 is captured at a second time of flight, where the second time of flight is delayed (e.g., 15 to 150 nanoseconds) relative to the first time of flight. As illustrated, the ridges of fingerprint images 410 and 420 are different, indicating a change in ridge profile (e.g., ridge width), with the ridges narrowing in fingerprint image 420 relative to fingerprint image 410. As illustrated, the observed width of the ridges narrows at the delayed time of flight in fingerprint image 420. The ridge of the fingerprint pattern are dark in the image and the valleys are white, because the ultrasonic signals are more absorbed at the ridges and more reflected at the valley due to the air gap present at the position of the valleys. In some embodiments, the ridge profile changes illustrating ridge narrowing at delayed times of flight can be used to determine whether the finger is a real finger or a fake finger.

Figure 5A:
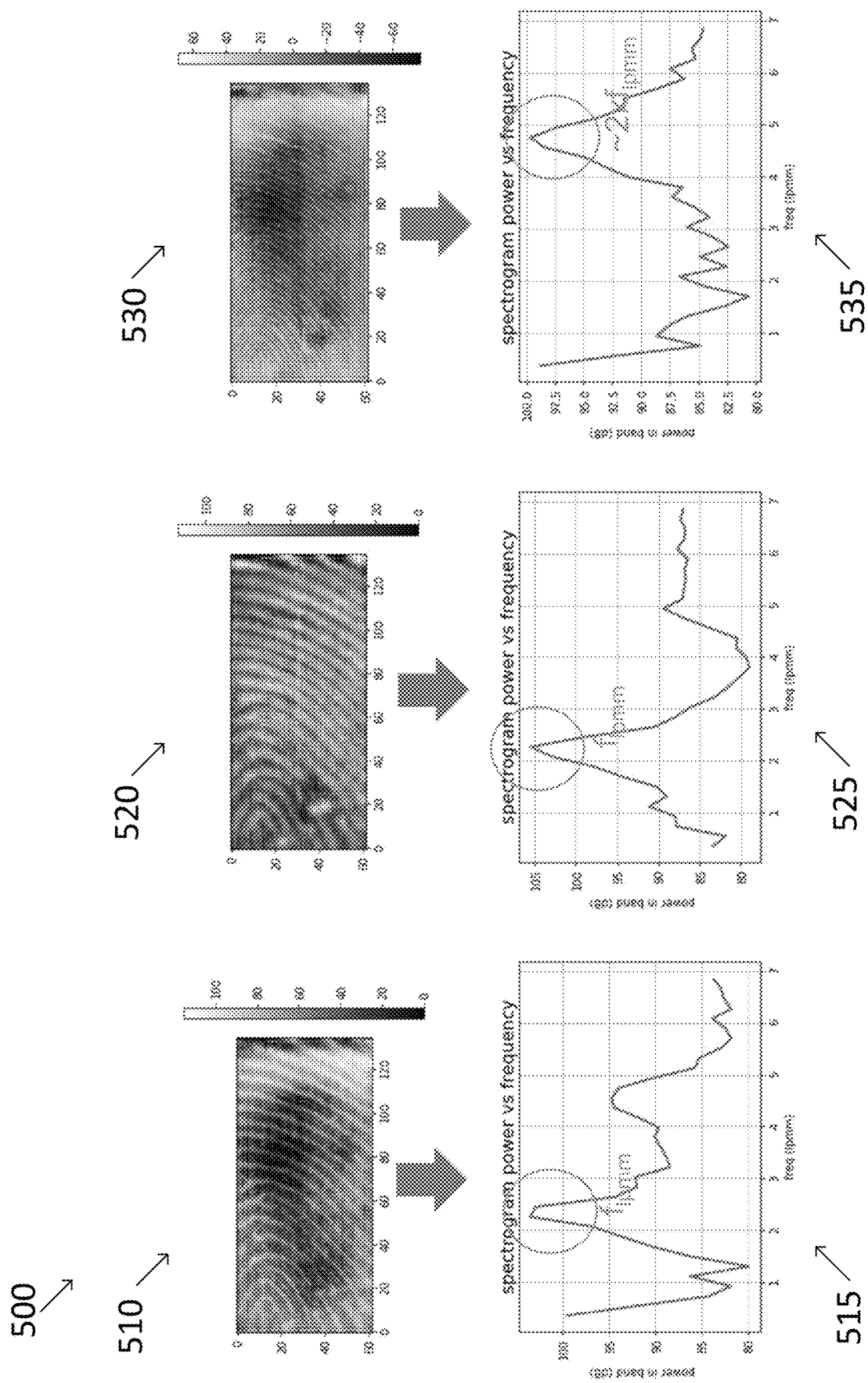
FIG. 5A illustrates example fingerprint images and graphs of spatial ridge frequency of a real finger, according to embodiments.

FIG. 5A illustrates example 500 fingerprint images and graphs of spatial ridge frequency of a real finger, according to embodiments. Example 500 illustrates first fingerprint image 510, second fingerprint image 520, and difference image 530, of a real finger, where the ridges are indicated in the fingerprint images as the darker patterns. First fingerprint image 510 is captured at a first time of flight, and second fingerprint image 520 is captured at a delayed time of flight relative to the first time of flight. Difference image 530 is generated by subtracting second fingerprint image 520 from first fingerprint image 510.

Graph 515 illustrates a graph of spectrogram power (e.g., signal strength) versus frequency of first fingerprint image 510, in which the maximum power corresponds to a spatial frequency range centered at approximately 2.4 line pairs per millimeter (lpmm). Graph 525 illustrates a graph of spectrogram power versus frequency of second fingerprint image 520, in which the maximum power also corresponds to a spatial frequency range centered at approximately 2.4 lpmm. Graph 535 illustrates a graph of spectrogram power versus frequency of difference image 530, in which the maximum power corresponds to a spatial frequency range centered at approximately 4.8 lpmm.

As illustrated in example 500, the frequency of detected ridges in difference image 530, as illustrated in graph 535, is substantially double the frequency of detected ridges in first fingerprint image 510 and second fingerprint image 520, indicative of the finger being a real finger. Where the finger is a real finger, due to ridge narrowing of second fingerprint image 520, the ridges of difference image 530 are observably split. Therefore, difference image 530 has substantially twice the main spatial frequency comparing to one of first fingerprint image 510 and second fingerprint image 520. Therefore, example 500 illustrates that first fingerprint image 510 and second fingerprint image 520 were generated using a real finger.

In some embodiments, the ratio of the signal strength of difference image 530 to the signal strength of one of first fingerprint image 510 and second fingerprint image 520 is determined. The ratio is then compared to a ratio range threshold. In some embodiments, the probability that the finger is a real finger is based on the ratio, wherein the probability that the finger is a real finger increases as the ratio increases. The reasoning is that for real fingers the change in width as a function of time of flight is more observable, and therefore the signal strength of the second spatial frequency range is higher.

Figure 5B:
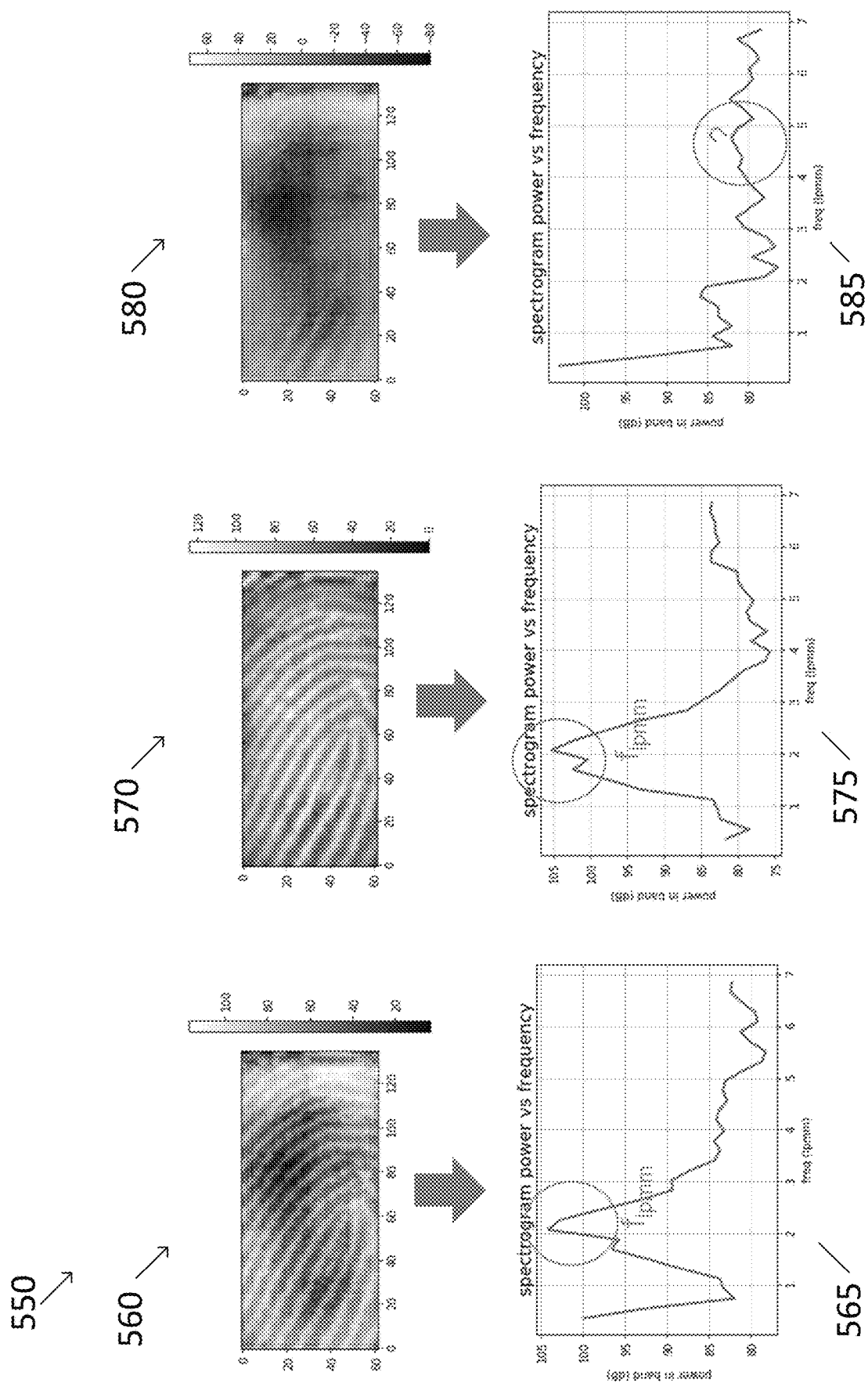
FIG. 5B illustrates example fingerprint images and graphs of spatial ridge frequency of a fake finger, according to embodiments.

FIG. 5B illustrates example 550 fingerprint images and graphs of spatial ridge frequency of a fake finger, according to embodiments. Example 550 illustrates first fingerprint image 560, second fingerprint image 570, and difference image 580, of a fake finger, where the ridges are indicated in the fingerprint images as the darker patterns. First fingerprint image 560 is captured at a first time of flight, and second fingerprint image 570 is captured at a delayed time of flight relative to the first time of flight. Difference image 580 is generated by subtracting second fingerprint image 570 from first fingerprint image 560.

Graph 565 illustrates a graph of spectrogram power versus frequency of first fingerprint image 560, in which the maximum power corresponds to a spatial frequency range centered at approximately 2.1 line pairs per millimeter (lpmm). Graph 575 illustrates a graph of spectrogram power versus frequency of second fingerprint image 570, in which the maximum power also corresponds to a spatial frequency range centered at approximately 2.1 lpmm. Graph 585 illustrates a graph of spectrogram power versus frequency of difference image 580, in which the maximum power at around twice the main frequency contributions of the first and/or second image is difficult to determine.

As illustrated in example 550, the frequency of detected ridges in difference image 580, as illustrated in graph 585, is not substantially double the frequency of detected ridges in first fingerprint images 560 or second fingerprint image 570, indicative of the finger being a fake finger. Moreover, there is no maximum or peak signal strength at or near 4.2 lpmm of difference image 580. Where the finger is a fake finger, the ridges of difference image 580 are not clearly observable. In particular, there is no observable ridge splitting in difference image 580, and no observable ridge narrowing between first fingerprint images 560 and second fingerprint image 570. Therefore, example 550 illustrates that first fingerprint images 560 and second fingerprint image 570 were generated using a fake finger.

Figure 6A:
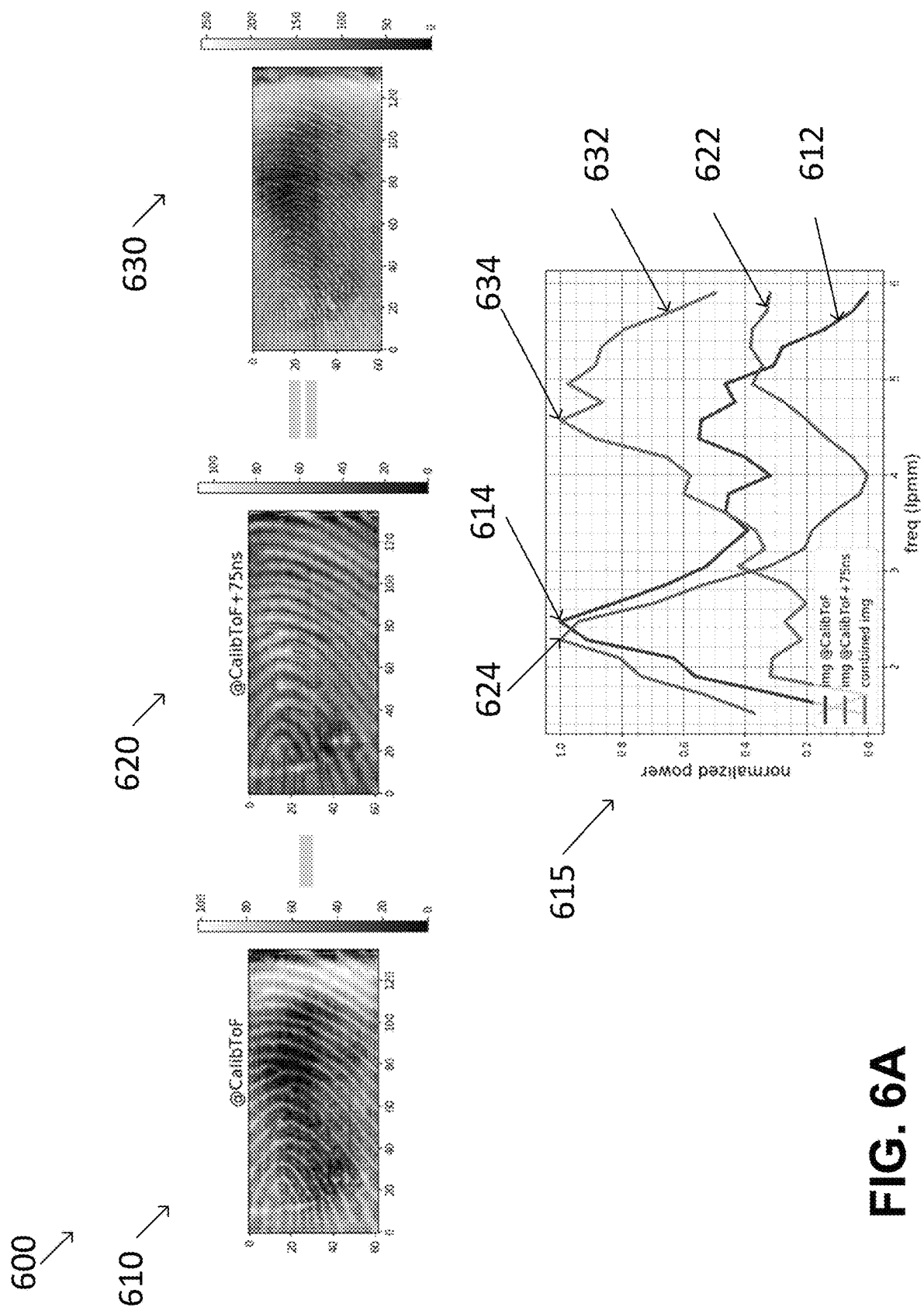
FIG. 6A illustrates example fingerprint images and a combined graph of spatial ridge frequency of a real finger, according to embodiments.

FIG. 6A illustrates example 600 of fingerprint images and a composite graph of spatial ridge frequency of a real finger, according to embodiments. Example 600 illustrates first fingerprint image 610, second fingerprint image 620, and difference image 630, of a real finger, where the ridges are indicated in the fingerprint images as the darker patterns. First fingerprint image 610 is captured at a first time of flight, and second fingerprint image 620 is captured at a delayed time of flight relative to the first time of flight. Difference image 630 is generated by subtracting second fingerprint image 620 from first fingerprint image 610.

Graph 615 illustrates a graph of normalized power (e.g., signal strength) versus frequency of first fingerprint image 610, second fingerprint image 620, and difference image 630. First fingerprint image 610 corresponds to a ridge frequency of approximately 2.5 lpmm, as indicated at point 614 of line 612. Second fingerprint image 620 corresponds to a ridge frequency of approximately 2.3 lpmm, as indicated at point 624 line 622. Difference image 630 corresponds to a maximum ridge frequency of approximately 4.6 lpmm as indicated at point 634 of line 632.

As illustrated in graph 615, the frequency of detected ridges in difference image 630 is substantially double the frequency of detected ridges in first fingerprint image 610 and second fingerprint image 620, indicative of the finger being a real finger. Where the finger is a real finger, due to ridge narrowing of second fingerprint image 620, the ridges of difference image 630 are observably split. Therefore, difference image 630 has substantially twice the main spatial frequency comparing to one of first fingerprint image 610 and second fingerprint image 620. Therefore, example 600 illustrates that first fingerprint image 610 and second fingerprint image 620 were generated using a real finger.

In some embodiments, the ratio of the signal strength of difference image 630 to the signal strength of one of first fingerprint image 610 and second fingerprint image 620 is determined. The ratio is then compared to a ratio range threshold. In some embodiments, the probability that the finger is a real finger is based on the ratio, wherein the probability that the finger is a real finger increases as the ratio increases. The reasoning is that for real fingers the change in width as a function of time of flight is more observable, and therefore the signal strength of the second spatial frequency range is higher.

Figure 6B:
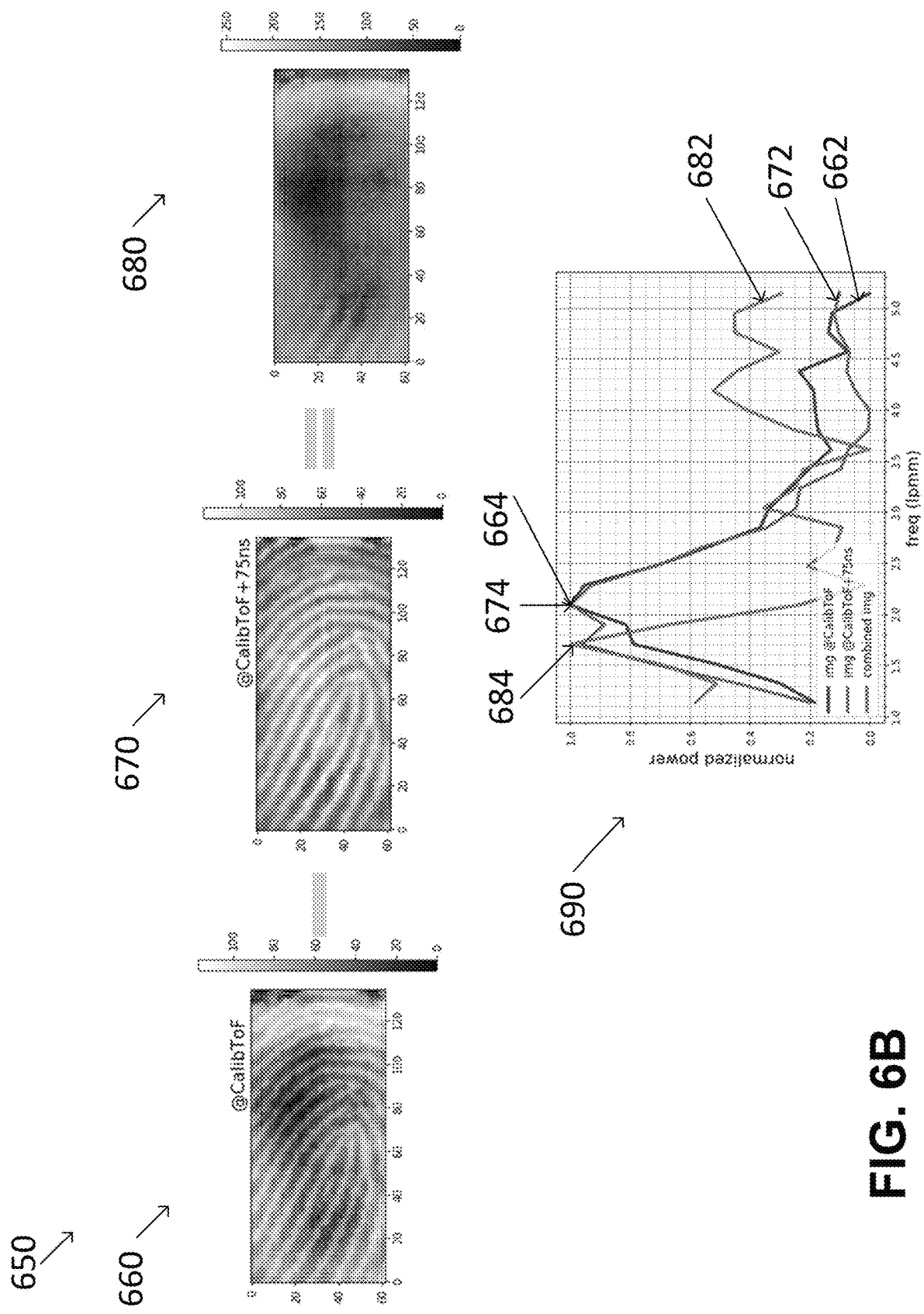
FIG. 6B illustrates example fingerprint images and a combined graph of spatial ridge frequency of a fake finger, according to embodiments.

FIG. 6B illustrates example 650 of fingerprint images and a composite graph of spatial ridge frequency of a fake finger, according to embodiments. Example 650 illustrates first fingerprint image 660, second fingerprint image 670, and difference image 680, of a fake finger, where the ridges are indicated in the fingerprint images as the darker patterns. First fingerprint image 660 is captured at a first time of flight, and second fingerprint image 670 is captured at a delayed time of flight relative to the first time of flight. Difference image 680 is generated by subtracting second fingerprint image 670 from first fingerprint image 660.

Graph 690 illustrates a graph of normalized power (e.g., signal strength) versus frequency of first fingerprint image 660, second fingerprint image 670, and difference image 680. First fingerprint image 660 and second fingerprint image 670 correspond to a ridge frequency of approximately 2.2 lpmm, as indicated at point 664 of line 662 and point 674 of line 672, respectively. Difference image 680 corresponds to a maximum ridge frequency of approximately 1.4 lpmm, as indicated at point 684 of line 682.

As illustrated in graph 690, the frequency of detected ridges in difference image 680 is not substantially double the frequency of detected ridges in first fingerprint image 660 or second fingerprint image 670, indicative of the finger being a fake finger. Where the finger is a fake finger, the ridges of difference image 680 are not observable. In particular, there is no observable ridge splitting in difference image 680, and no observable ridge narrowing between first fingerprint image 660 and second fingerprint image 670. Therefore, example 650 illustrates that first fingerprint image 660 and second fingerprint image 670 were generated using a fake finger.

Figure 7:
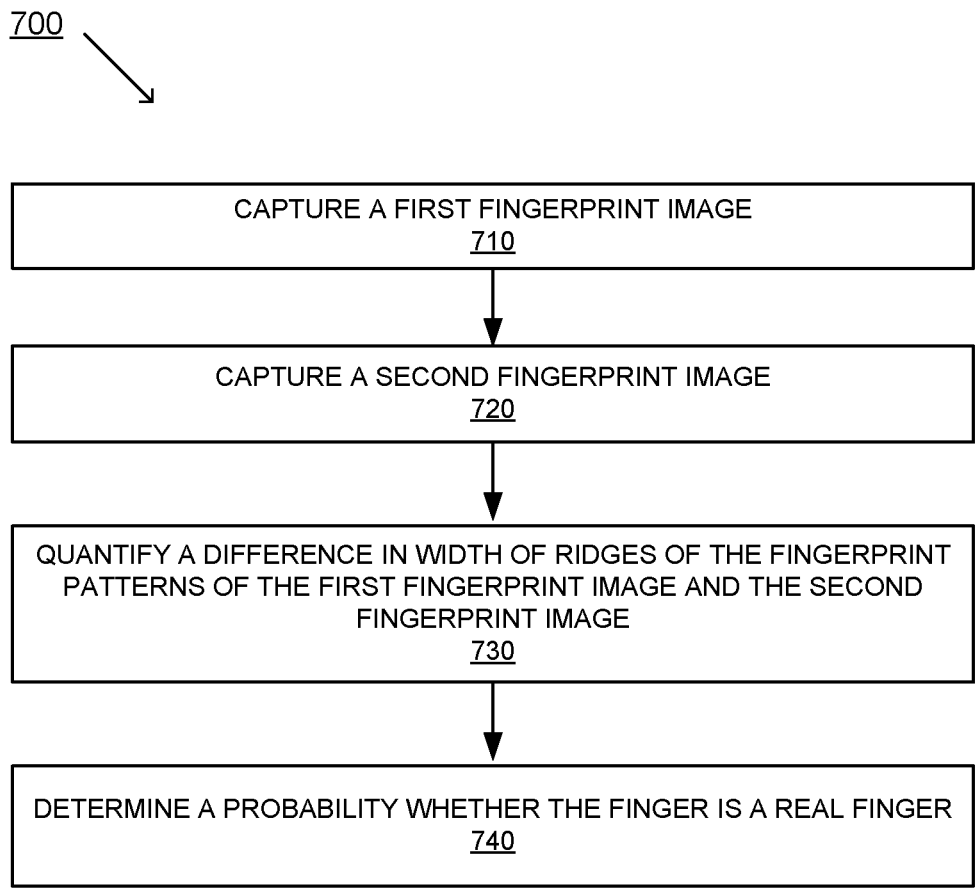
FIG. 7 illustrates an example process for determining whether a finger is a real finger at an ultrasonic fingerprint sensor, according to some embodiments.
Figure 8:
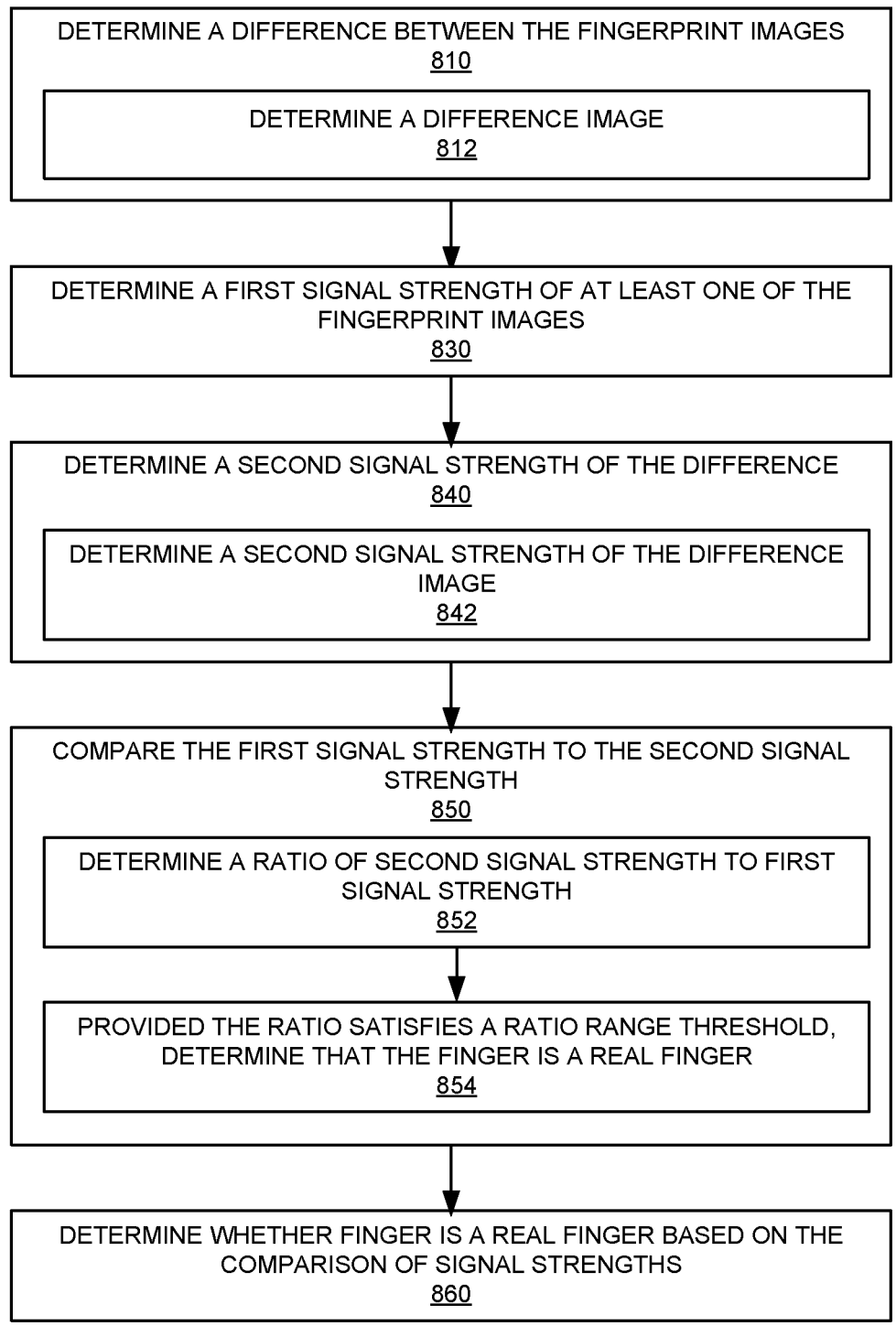
FIG. 8 illustrates an example process for quantifying a difference in width of ridges of different fingerprint images, according to some embodiments.
Figure 9:
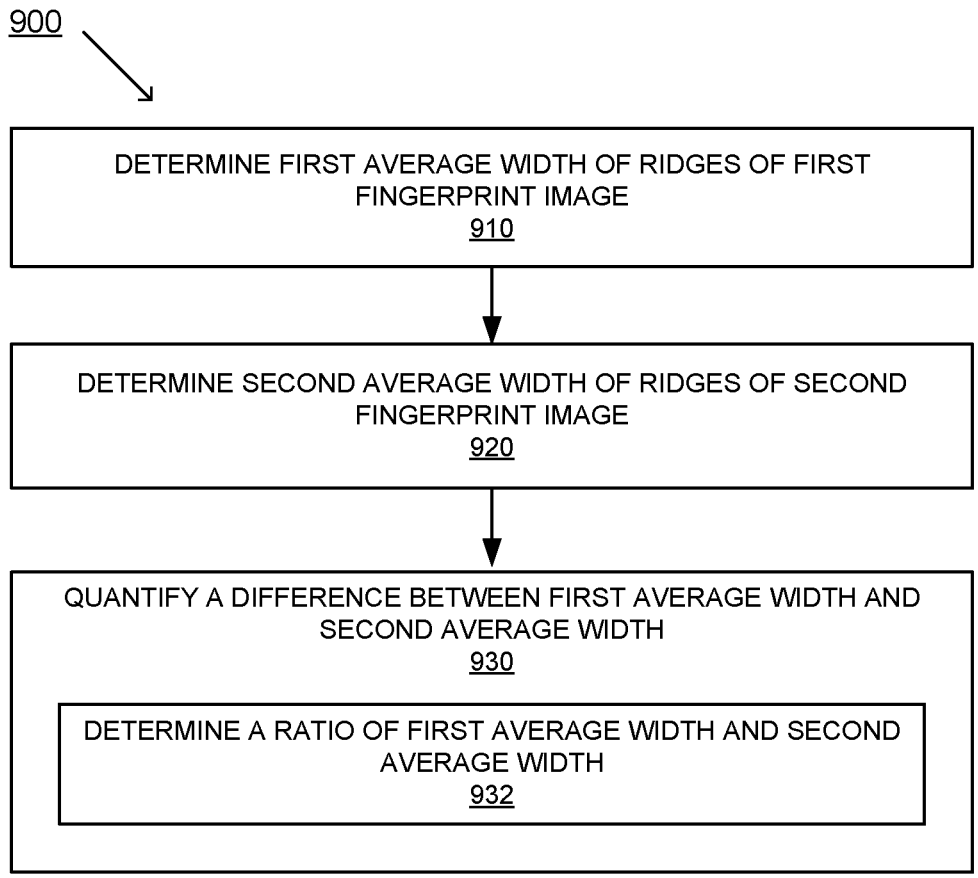
FIG. 9 illustrates an example process for quantifying a difference in width of ridges of different fingerprint images, according to other embodiments.

Example Operations for Operating a Fingerprint Sensor for Determining Whether a Finger is a Real Finger or a Fake Finger FIGS. 7 through 9 illustrate example processes for determining whether a finger is a real finger at a fingerprint sensor, according to some embodiments. Procedures of the example processes will be described with reference to elements and/or components of various figures described herein. It is appreciated that in some embodiments, the procedures may be performed in a different order than described, that some of the described procedures may not be performed, and/or that one or more additional procedures to those described may be performed. The flow diagram includes some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

At procedure 710 of flow diagram 700, a first image of a fingerprint pattern is captured at an ultrasonic fingerprint sensor, wherein the first image is based on ultrasonic signals corresponding to a first time of flight range. At procedure 720, a second image of the fingerprint pattern is captured at the ultrasonic fingerprint sensor, wherein the second image is based on ultrasonic signals corresponding to a second time of flight range, the second time of flight range being delayed compared to the first time of flight range.

At procedure 730, a difference in a width of ridges of the fingerprint pattern in the first image compared to the width of ridges of the fingerprint pattern in the second image is quantified.

In some embodiments, procedure 730 is performed according to flow diagram 800 of FIG. 8. At procedure 810 of flow diagram 800, a difference between the first image and the second image. In one embodiment, as shown at procedure 812, a difference image is generated by subtracting the second image from the first image. At procedure 830, a first signal strength is determined at a first spatial frequency range of at least one of the first image and the second image. At procedure 840, a second signal strength is determined at a second spatial frequency range of the difference between the first image and the second image. In one embodiment, as shown in procedure 842, the second signal strength is determined at the second spatial frequency range of the difference image between the first image and the second image. In one embodiment, the first signal strength corresponds to a maximum in signal strength of the first spatial frequency range and wherein the second signal strength corresponds to a maximum in signal strength of the second spatial frequency range. In one embodiment, the second frequency range is distributed around a frequency substantially double a main frequency contribution of the first frequency range. In one embodiment, the first spatial frequency range corresponds to a spatial ridge frequency range of the fingerprint pattern.

At procedure 850, the first signal strength is compared to the second signal strength. In some embodiments, as shown at procedure 852, a ratio of the second signal strength to the first signal strength is determined. Provided the ratio satisfies a ratio range threshold, as shown at procedure 854, it is determined that the finger is a real finger. In one embodiment, the ratio range threshold is above 0.8. Based on the comparing, as shown at procedure 860, the probability that the finger is a real finger is determined. In one embodiment, the probability that the finger is a real finger is based on the ratio of the second signal strength to the first signal strength, wherein the probability that the finger is a real finger increases as the ratio of the second signal strength to the first signal strength increases.

In other embodiments, procedure 730 is performed according to flow diagram 900 of FIG. 9. At procedure 910 of flow diagram 900, a first average width of ridges of the fingerprint pattern of the first image is determined. At procedure 920, a second average width of ridges of the fingerprint pattern of the second image is determined. At procedure 930, a difference between the first average width and the second average width is quantified. In some embodiments, as shown at procedure 932, a ratio of the first average width to the second average width is determined. In some embodiments, determining the probability whether the finger is a real finger includes comparing of the ratio of the first average width and the second average width to a width range threshold.

Returning to flow diagram 700 of FIG. 7, at procedure 740, based on the quantification of the difference, a probability whether the finger is a real finger is determined.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for determining whether a finger is a real finger at a fingerprint sensor, the method comprising:
    capturing a first image of a fingerprint pattern at an ultrasonic fingerprint sensor, wherein the first image is based on ultrasonic signals corresponding to a first time of flight range;
    capturing a second image of the fingerprint pattern at the ultrasonic fingerprint sensor, wherein the second image is based on ultrasonic signals corresponding to a second time of flight range, the second time of flight range being delayed compared to the first time of flight range;
    quantifying a difference in a width of ridges of the fingerprint pattern in the first image compared to the width of ridges of the fingerprint pattern in the second image, wherein the quantifying the difference in the width of the ridges of the fingerprint pattern in the first image compared to the width of ridges of the fingerprint pattern in the second image comprises:
        determining a difference between the first image and the second image;
        determining a first signal strength at a first spatial frequency range of at least one of the first image and the second image;
        determining a second signal strength at a second spatial frequency range of the difference between the first image and the second image; and
        comparing the first signal strength to the second signal strength; and
        determining, based on the comparing, the probability that the finger is a real finger; and
    based on the quantification of the difference, determining a probability whether the finger is a real finger.

2. The method of claim 1, wherein the comparing the first signal strength to the second signal strength comprises:
    determining a ratio of the second signal strength to the first signal strength; and
    provided the ratio satisfies a ratio range threshold, determining that the finger is a real finger.

3. The method of claim 2, wherein the ratio range threshold is above 0.8.

4. The method of claim 1, wherein the probability that the finger is a real finger is based on the ratio of the second signal strength to the first signal strength, wherein the probability that the finger is a real finger increases as the ratio of the second signal strength to the first signal strength increases.

5. The method of claim 1, wherein the second spatial frequency range is distributed around a frequency substantially double a main frequency contribution of the first spatial frequency range.

6. The method of claim 1, wherein the first spatial frequency range corresponds to a spatial ridge frequency range of the fingerprint pattern.

7. The method of claim 1, wherein the first signal strength corresponds to a maximum in signal strength of the first spatial frequency range and wherein the second signal strength corresponds to a maximum in signal strength of the second spatial frequency range.

8. The method of claim 1, wherein the determining the difference between the first image and the second image:
    generating a difference image by subtracting the second image from the first image.

9. The method of claim 8, wherein the determining second signal strength at the second spatial frequency range of the difference between the first image and the second image comprises:
    determining the second signal strength at the second spatial frequency of the of the difference image.

10. An ultrasonic fingerprint sensor device comprising:
    a two-dimensional array of ultrasonic transducers; and
    a processor, wherein the processor is configured to:
        capture a first image of a fingerprint pattern at an ultrasonic fingerprint sensor, wherein the first image is based on ultrasonic signals corresponding to a first time of flight range;
        capture a second image of the fingerprint pattern at the ultrasonic fingerprint sensor, wherein the second image is based on ultrasonic signals corresponding to a second time of flight range, the second time of flight range being delayed compared to the first time of flight range;
        determine a difference between the first image and the second image;
        determine a first signal strength at a first spatial frequency range of at least one of the first image and the second image;
        determine a second signal strength at a second spatial frequency range of the difference between the first image and the second image;
        compare the first signal strength to the second signal strength;
        quantify a difference in a width of ridges of the fingerprint pattern in the first image compared to the width of ridges of the fingerprint pattern in the second image; and
        based on the compare and a quantification of the difference, determine a probability whether the finger is a real finger.

11. The ultrasonic fingerprint sensor device of claim 10, wherein the processor is further configured to:
    determine a ratio of the second signal strength to the first signal strength; and
    provided the ratio satisfies a ratio range threshold, determine that the finger is a real finger.

12. The ultrasonic fingerprint sensor device of claim 10, wherein the probability that the finger is a real finger is based on the ratio of the second signal strength to the first signal strength, wherein the probability that the finger is a real finger increases as the ratio of the second signal strength to the first signal strength increases.

13. The ultrasonic fingerprint sensor device of claim 10, wherein the second frequency range is distributed around a frequency substantially double a main frequency contribution of the first frequency range.

14. A method for determining whether a finger is a real finger at a fingerprint sensor, the method comprising:
- capturing a first image of a fingerprint pattern at an ultrasonic fingerprint sensor, wherein the first image is based on ultrasonic signals corresponding to a first time of flight range;
- capturing a second image of the fingerprint pattern at the ultrasonic fingerprint sensor, wherein the second image is based on ultrasonic signals corresponding to a second time of flight range, the second time of flight range being delayed compared to the first time of flight range;
- quantifying a difference in a width of ridges of the fingerprint pattern in the first image compared to the width of ridges of the fingerprint pattern in the second image, wherein the quantifying the difference in the width of the ridges of the fingerprint pattern in the first image compared to the width of ridges of the fingerprint pattern in the second image comprises:
  - determining a first average width of ridges of the fingerprint pattern of the first image;
  - determining a second average width of ridges of the fingerprint pattern of the second image; and
  - quantifying a difference between the first average width and the second average width; and
- based on the quantification of the difference, determining a probability whether the finger is a real finger.

15. The method of claim 14, wherein the quantifying the difference between the first average width and the second average width comprises:
- determining a ratio of the first average width to the second average width.

16. The method of claim 15, wherein the determining the probability whether the finger is a real finger comprises:
- comparing of the ratio of the first average width and the second average width to a width range threshold.

17. An ultrasonic fingerprint sensor device comprising:
a two-dimensional array of ultrasonic transducers; and
a processor, wherein the processor is configured to:
- capture a first image of a fingerprint pattern at an ultrasonic fingerprint sensor, wherein the first image is based on ultrasonic signals corresponding to a first time of flight range;
- capture a second image of the fingerprint pattern at the ultrasonic fingerprint sensor, wherein the second image is based on ultrasonic signals corresponding to a second time of flight range, the second time of flight range being delayed compared to the first time of flight range;
- quantify a difference in a width of ridges of the fingerprint pattern in the first image compared to the width of ridges of the fingerprint pattern in the second image, comprising:
  - determine a first average width of ridges of the fingerprint pattern of the first image;
  - determine a second average width of ridges of the fingerprint pattern of the second image; and
  - quantify a difference between the first average width and the second average width; and
- based on the quantification of the difference, determine a probability whether the finger is a real finger.

* * * * *